(12) United States Patent
Hauke (10) Patent No.: US 8,199,160 B2
(45) Date of Patent: Jun. 12, 2012

(54) METHOD AND APPARATUS FOR MONITORING A USER'S ACTIVITIES

(75) Inventor: Rudolf Hauke, Niederstotzingen (DE)

(73) Assignee: Advanced US Technology Group, Inc., Clearwater, FL (US)

( * ) Notice: Subject to any disclaimer, the term of this patent is extended or adjusted under 35 U.S.C. 154(b) by 778 days.

(21) Appl. No.: 11/421,892

(22) Filed: Jun. 2, 2006

(65) Prior Publication Data

US 2008/0049027 A1 Feb. 28, 2008

(51) Int. Cl.
G09G 5/39 (2006.01)
G09G 5/36 (2006.01)

(52) U.S. Cl. ........ 345/531; 345/545

(58) Field of Classification Search ........ 725/9, 10, 725/19, 18, 25, 28, 31; 345/531, 545
See application file for complete search history.

(56) References Cited

U.S. PATENT DOCUMENTS

| | | | |
|---|---|---|---|
| 6,850,252 B1 * | 2/2005 | Hoffberg | 715/716 |
| 6,898,799 B1 | 5/2005 | Jarman | |
| 7,046,308 B1 * | 5/2006 | Tran et al. | 348/725 |
| 2003/0227475 A1 | 12/2003 | Fellenstein et al. | |
| 2004/0006767 A1 | 1/2004 | Robson et al. | |
| 2004/0189873 A1 | 9/2004 | Konig et al. | |
| 2004/0205334 A1 * | 10/2004 | Rennels | 713/154 |
| 2004/0255321 A1 * | 12/2004 | Matz | 725/14 |
| 2004/0260801 A1 * | 12/2004 | Li | 709/223 |
| 2005/0240959 A1 | 10/2005 | Kuhn et al. | |
| 2005/0251399 A1 * | 11/2005 | Agarwal et al. | 705/1 |
| 2006/0020714 A1 * | 1/2006 | Girouard et al. | 709/246 |
| 2006/0277565 A1 * | 12/2006 | Long et al. | 725/28 |
| 2007/0204288 A1 * | 8/2007 | Candelore | 725/28 |

FOREIGN PATENT DOCUMENTS

| | | |
|---|---|---|
| WO | WO-0237853 | 5/2002 |
| WO | WO-03017640 | 2/2003 |
| WO | WO-2005109883 | 11/2005 |

* cited by examiner

Primary Examiner — Jacinta M Crawford
(74) Attorney, Agent, or Firm — Muncy, Geissler, Olds & Lowe, PLLC (57) ABSTRACT

A method for monitoring a user's activities, wherein the activities comprising an output via a graphics device having a frame buffer. The method includes retrieving image data from the frame buffer, examining the image data, identifying an offensive attribute within the image data, and reacting to the attribute in a predefined way.

17 Claims, 5 Drawing Sheets

METHOD AND APPARATUS FOR MONITORING A USER'S ACTIVITIES

BACKGROUND

The invention relates to a method and an apparatus for monitoring a user's activities. In principle, such applications are broadly known today for saving children from viewing offensive pictures, reading offensive texts or listening to offensive music by blocking the offensive content after detecting it. The offensive content is usually detected by using content recognition algorithms on texts, images or audio and/or video streams, and combinations thereof, and classifying the recognized content into predefinable categories. This can be achieved by comparing the recognized content to predefinable violation examples such as keywords and the like.

Different levels of monitoring are used in prior art. Most applications work on a network level, for example, in search engines, internet gateways or proxy servers. However, only content obtained via a network can be analyzed this way. Even then, encrypted data, such as transmitted by the HTTPS protocol or within encrypted e-mails, cannot be analyzed without expensively breaking the code. If once such a monitoring instance has been successfully bypassed somehow, the same offensive content can be consumed locally again and again without control.

A different kind of application is known to monitor data sent to a printer, wherein the sent data are analyzed within a printer driver on an operating system level. If characteristics of bank notes are detected within the sent data, only a part of the data is sent to the printer. Instead of printing the rest, a warning about counterfeit money is output. However, such countermeasures require system administrator privileges to install the appropriate printer driver. It is not possible to install them without permission. Secret monitoring of a user's behavior is not possible thus. Besides, these countermeasures can be circumvented by simply using a different operating system.

In a similar way as said printer driver, some graphics software denies to open files that contain an image of a bank note. This protection can be circumvented by simply using different software.

In enhanced monitoring applications, such as the one described in PCT patent application WO 2005/109883 A2, parents are automatically informed by a portable device about an offense of a user or an attempt to one. The device may also inform about its whereabout using a positioning system.

SUMMARY OF THE INVENTION

It is an object of the invention to specify a method and an apparatus for monitoring a user's activities by which any content can be analyzed, wherein the analysis may not be circumvented.

According to the present invention, this problem is solved by monitoring the output where it is digitally accessible in a form in which it is finally output on an (analogue) interface to the user, i. e. before it is displayed on a human-readable device,—at a frame buffer of the graphics device. There, content from any source, even if encrypted during transmission, can be expected to be rendered to a visually perceivable form, in particular without encryption. This will be the case each time the content is consumed. Besides, monitoring the frame buffer content works completely independent from the source of the content, i. e. the medium it has been loaded from. The graphics device may in particular be a graphics adapter, an integrated graphics controller for a portable device or a graphics processing unit for a printer.

The content must be digitally available in the frame buffer as it cannot be displayed otherwise. So, if the user wants to watch or print certain content, the content will be rendered to the frame buffer in the form of a digital image. From the frame buffer, it can be easily retrieved and analyzed according to the present invention. Such a frame buffer may not only be located in a dedicated graphics memory, but also in a main memory of a computer, in particular as a temporary storage of the operating system, from where it is copied to an actual graphics memory, or as a shared graphics memory area.

The method according to the present invention comprises steps of retrieving image data from a frame buffer of a graphics device, examining said image data, identifying an offensive attribute within said image data, and reacting to said attribute in a predefined way. Retrieving the image data from the frame buffer is advantageous over collecting the data in a graphics driver (before they are written to the frame buffer), because even such data can be examined that are directly written to the frame buffer, bypassing the graphics driver. Such direct frame buffer access is used to achieve a better performance and is provided by nearly all popular operating systems.

The invention can be realized in hardware, for example, in a graphics processor for graphics adapters, mobile devices, or printers, which naturally has direct access to the frame buffer. The invention can alternatively be simply realized in software for whose installation system administrator privileges are not mandatory. A combination hardware and software implementation is possible, too.

Preferably, said reacting step comprises denying the output of at least a part of said image data. A child can thus be saved from mental damage with small effort.

In a different embodiment, said reacting step comprises replacing at least a part of said image data by a predefined substitute. This way, a child is saved from mental damage and can be informed or warned about the offensive attribute.

Preferably, said reacting step comprises logging said identification into a memory. The information about said identification can thus be preserved for later use, in particular for communicating it to a surveillance instance.

In a preferred embodiment, said reacting step comprises communicating a message to a surveillance instance, said message comprising an indicator for said identification and/or indicators for identifications logged earlier. This enables the surveillance instance to react to the identification of the attribute. This embodiment is of particular interest if the attribute is assigned to criminal or terrorist activities.

Advantageously, said reacting step comprises waiting for an established internet connection before communicating said message. So the information about the identification is not lost.

An advanced embodiment comprises a step of determining a whereabout of said device by means of a positioning system, wherein said message comprises said whereabout. Thereby, the surveillance instance is informed where to find the user. This is of particular interest in case of criminal or terrorist activities.

In a special embodiment, a nearby cellular phone is detected and said whereabout is determined utilizing said nearby cellular phone. Cellular phones are widespread. Hence, there is a high probability that there is one in range. They provide an easy way to determine the whereabout of the user.

In another preferred embodiment, a nearby cellular phone is detected and said message is communicated via said nearby cellular phone. This way, a feedback message can be communicated even without an internet connection. However, the message can also be communicated by an internet connection via a cellular phone. As described above, there is a high probability that a cellular phone is in range.

Advantageously, said examining step comprises a content-based classification of said image data. This enables a high-quality examination and identification of offensive attributes.

One possibility for said content-based classification comprises an optical character recognition. This way, on-screen text can be used for the examination.

Preferably, said graphics device is a graphics adapter or a graphics processing unit of a printer.

Said frame buffer may be integrated into said graphics device or may be a shared memory area in a main memory.

In preferred embodiments, said offensive attribute is matched with predefined categories for determining said reacting step. This enables to provide different reactions for different scenarios. For example, light sexually explicit content may only be blocked while heavy sexually explicit content may be blocked and communicated to the parents as surveillance instance, whereas criminal or terrorist content is only communicated to a government authority without any blocking.

In an enhanced implementation, said offensive attribute is a variation in said image data, predefined to be recognizable by the method. This way, documents containing said variation can be traced.

The invention can be advantageously used in an apparatus in the form of a graphics controller for a graphics adapter for a computer, or a cellular phone or a handheld computer or a digital television set, or a graphics processing unit for a printer.

DETAILED DESCRIPTION OF THE INVENTION

Figure 1:
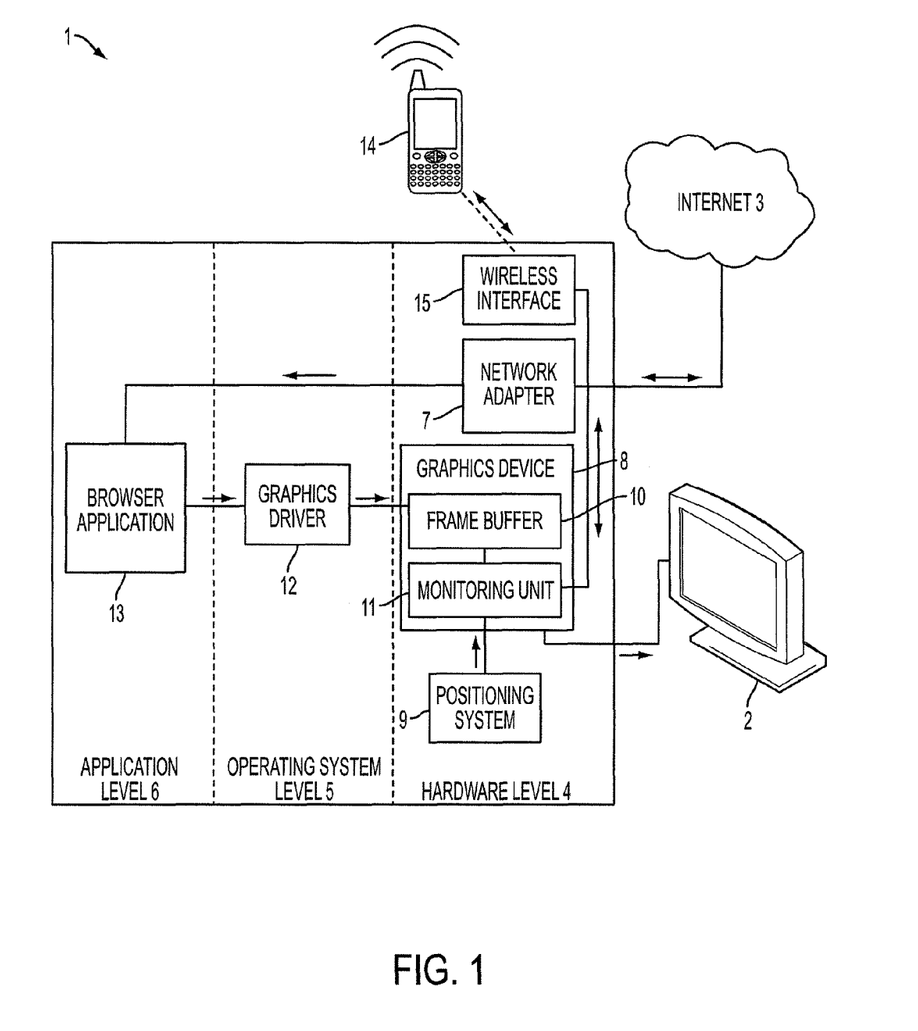
FIG. 1 shows a computer system realizing the invention.

FIG. 1 shows an exemplary computer system 1 realizing the invention. A monitor is connected to it as a human-readable device 2. The computer system 1 is connected to the internet 3. The computer system 1 can be schematically divided into a Hardware Level 4, an Operating System Level 5 and an Application Level 6.

The Hardware Level 4 comprises a network adapter 7, a graphics adapter as a graphics device 8 and a positioning system 9, a CPU (not shown) and a main memory (not shown). The graphics device 8 comprises a graphics memory as a frame buffer 10, a graphics controller (not shown) and a monitoring unit 11. The human-readable device 2 is connected to an analogue port of the graphics adapter. In an alternative embodiment (not shown) the human-readable device 2 can be a flat screen connected to a digital port of the graphics adapter.

The Operating System Level 5 comprises a graphics driver 12 that is encapsulated by the operating system in order to provide an application programming interface to applications running on the Application Level 6 for a standard graphical user interface.

The Application Level 6 comprises an exemplary browser application 13. Here, a user can decide which web pages from the internet to load and view by typing on a keyboard (not shown) and clicking a mouse (not shown). He can also open files already saved locally on the computer system 1 instead of downloading them from the internet 3. Such files may be whole web pages, single images or texts or single audio and/or video files. Such files can be locally opened from a hard disk, a floppy disk, a compact disk, a memory stick or any other storage media or peripheral device. The monitoring works independently from the source medium.

For example, if the user decides to load and view a certain web page from the internet 3, a HTTP or HTTPS request is sent to the appropriate internet server via the network adapter 7. A respective response is then received by the browser application 13 via the network adapter 7, carrying the texts and the images of the requested web page. The browser application 12 reconstructs the layout of the loaded web page and outputs the content, i. e., texts and images, to the encapsulated graphics driver 12. The graphics driver 12 renders texts to images and writes the web page content to the frame buffer 10 of the graphics device 8 in the form of digital image data. The digital image in the frame buffer 10 is periodically read by the graphics controller. Its pixels are converted to analogue color intensities and output to the human-readable device 2 where they become visible, optically reproducing the loaded web page.

The frame buffer 10 is the last instance where the content to be output is digitally available within the computer system 1. Besides, in the frame buffer 10 any content to be output is decrypted at the latest. So, according to the present invention, the monitoring unit 11 on the graphics device 8 retrieves at least a part of the image data from the frame buffer 10. Preferably, it retrieves all the image data from the frame buffer 10, i. e. the whole digital image that is to be output. The latter is similar to taking a screenshot, but within the Hardware Level 4. Preferably, before retrieving the image data, the monitoring unit 11 waits until a respective frame has been completely written to the frame buffer 10. This way, no image data is left out.

The monitoring unit 11 examines the retrieved image data for one or several offensive attributes. The digital image can be classified into one of several categories. For example, if at least one silhouette of a human in an arbitrary attitude, and a large fraction of skin colors are detected the retrieved digital image is classified to be at least "revealing" if not "sexually explicit", depending on a predefined selectivity setting. The monitoring unit 11 can also use optical character recognition for finding, retrieving and analyzing text from the digital image for offensive attributes. The whole spectrum of image recognition can be used for examining the image data and identifying offensive pictorial attributes. For example, a "Search Images by Appearance" algorithm can be used. It detects invariant features, i. e. features that do not vary if the image is transformed by some transformation group, using feature histograms. However, the invention itself is independent from actual image recognition algorithms. Thereby, the invention can also utilize future image recognition methods.

If such an offensive attribute or a combination of offensive attributes is identified within the digital image, the monitoring unit 11 can react in two different ways. On the one hand it can deny, i. e. block, the output of the digital image to the human-readable device 2 in parts or as a whole by modifying parts of or the whole frame buffer 10, or by switching off the electrical output signals to the human-readable device 2. The modification of the frame buffer 10 can comprise blackening, whitening or other garbling, or replacing by a substitute, for example, a warning. Such a warning may be an image of a scolding parent or another impressive picture. In particular, the output of the area of said offensive attribute may be denied this way. On the other hand, the monitoring unit 11 can communicate a message about the identification of the offensive attribute to a surveillance instance. The message just can comprise an indicator for the identification or it can comprise the category of the identified attribute, too. The message can additionally comprise location information. For this purpose, the whereabout of the computer system 1 is acquired using the positioning system 9. The whereabout is then included in the message. The surveillance instance will thus be informed about the location of the user.

Both possibilities, blocking and informing about the identification of the offensive attribute, may be combined. So, if a child watches offensive pictures from the internet 3 on the human-readable device 2, both the offensive content can be blocked and the parents can be informed via a message.

The embodiment of FIG. 1 shows another possibility for determining the whereabout, for identifying the user and/or for communicating a message to a surveillance instance. For this purpose, the monitoring system 11 detects any cellular phones 14 within the range of the computer system 1 by a wireless interface 15. The wireless interface 15 can be a radio interface such as in the bluetooth standard. Alternatively, it can be an infrared port. If a cellular phone 14 is detected, the whereabout of the computer system 1 can de roughly detected by querying the cellular phone 14 for its current cell information. The identity of the user can be identified by querying the phone number of the cellular phone 14. Besides, the message to the surveillance instance can be sent via the cellular phone 14 as a short message or as a call, in particular a data call using a HCSD, GPRS, UMTS or any other protocol. It is also possible just to indicate the identification of an offensive attribute by a special single radio signal sent via the cellular phone 14. The location of the user can be determined by the surveillance instance using the data provided by the cellular network operator. Preferably, the transmission via the cellular phone is carried out secretly so that the user is not informed about it.

If the computer system 1 has a permanent connection to the internet 3, a message about the identification of the offensive attribute may be sent immediately after identifying the offensive attribute. The message can be sent via the network adapter 7 to a predefinable remote server in the internet 3 as a surveillance instance. The amount of data to be sent can be kept small for a small footprint. The remote server may forward the message to a parent or another authority.

If a permanent connection to the internet 3 is not available, an identification of an offensive attribute can be logged into a memory. Several identifications may be stored there until an internet connection is established for the next time. The stored information may comprise the type of the offensive attribute or it may just comprise an indicator for the identification itself. It may additionally comprise the whereabout of the computer system 1 at the time of the identification of the offensive attribute. Alternatively, the whereabout might be determined at the time of communicating the message. For example, on a laptop having a wireless network adapter 7, possible identifications are logged and stored until the range of a wireless network is reached for the next time. Any connection to the internet 3 may be used, for example, via a modem, a LAN, a cable modem, a cellular phone, a satellite uplink, a power line, or ISDN.

Instead of communicating the message via the internet 3, it can be communicated directly via a cellular phone 14 in the range of the computer system 1 as described above. Identifications of offensive attributes can be logged into a memory and communicated to the surveillance instance the next time a cellular phone 14 is accessible. For example, the monitoring unit 11 can wait until a data exchange between a cellular phone 14 and the computer system 1 is performed by the user. Then, an additional transmission won't attract attention.

Besides, the monitoring unit 11 itself may be equipped with an antenna for cellular communication such as the GSM system. It may thus itself work as a transmission device if a cellular network is in range. Alternatively, it may listen to and decrypt communication of another cellular phone 14 within range. The identity data obtained this way can then be sent to the surveillance instance.

The monitoring unit 11 depicted in FIG. 1 can be fully implemented in hardware, in particular if it is designed to block only. If it is, additionally or alternatively, designed for communicating a message about the identification, it may even comprise its own sender and antenna. In the latter case, a metal housing of a computer may be utilized as an antenna. Alternatively, the communication can be performed either by a direct hardware access to the network adapter 7 or via a graphics driver running on the Operating System Layer 5, having access to high level sockets.

The invention can be integrated into a graphics adapter as described above. However, the graphics device 8 can also be a graphics processing unit of a printer.

Of course, the invention is not limited to monitoring the output of an internet browser application 13. Any application producing output visible on the human-readable device 2 will automatically be monitored and thus examined as all output will be accessible from the frame buffer 10. So, even future applications will be subject to monitoring.

For example, by using optical character recognition, activities in chat rooms can be monitored for sexually offensive words or for words indicating a meeting between the user and somebody else. If such words are identified and communicated to the parents of the user, they can take measures against pedophile dangers. On the other hand, a pedophile may be monitored for arranging a meeting in a chat room. In this case, the appropriate government agency can be informed, in particular in conjunction with identity data or cell information obtained from a nearby cellular phone 14. Other wireless phones can also be utilized for this purpose, for example by retrieving the phone number of the user or at least a neighbor from a base station in range. In case of chatting activities, an internet connection can be assumed to be established, so a short-term warning message can be sent to the respective surveillance instance.

Figure 2:
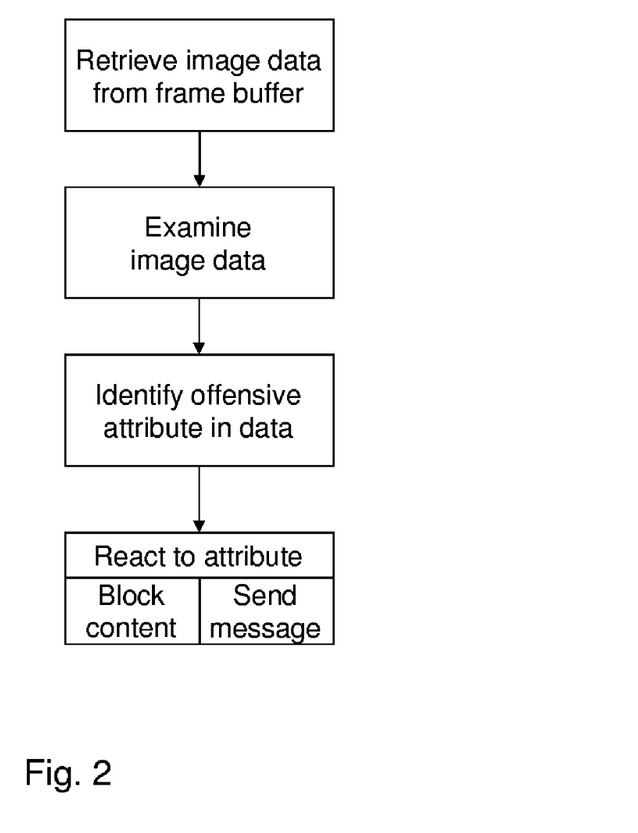
FIG. 2 shows a flow chart of the method according to the present invention

The flow of the method according to the present invention is depicted in FIG. 2. The possible reactions are either blocking the offensive attribute or communicating a feedback message to a surveillance instance or both.

Figure 3:
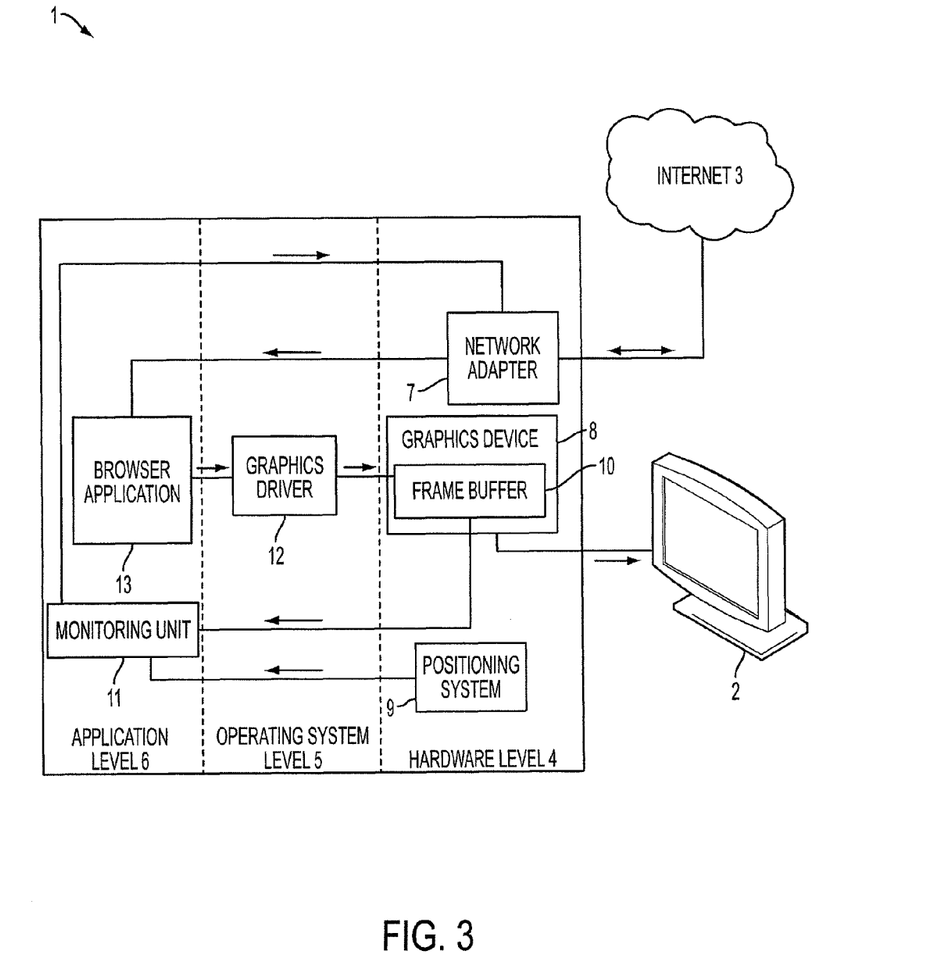
FIG. 3 shows an alternative implementation of the invention using a software monitoring unit.

Another implementation of the invention is shown in FIG. 3. It works similar to the one of FIG. 1. However, the monitoring unit 11 is implemented purely in software and running on the Application Level 6. The monitoring unit 11 is a simple executable application process running in the background. It retrieves image data from the frame buffer 10 on the graphics adapter by taking screenshots in regular intervals. The examination of the image data and the identification of offensive attributes are carried out as described above, but within the application process. This implementation does neither require system administrator privileges for installation nor special hardware. It is even easier to perform communication to the internet 3 as high level socket functions are available. The disadvantage of this implementation can be that the monitoring unit 11 might not be allowed to write to the frame buffer 10. Thus, blocking is made more difficult. It can be achieved by determining the application responsible for an identified attribute and forcing this application to close or by covering the attribute area, or the whole screen, by a top-level window. Such a top-level window even may have an irregular shape. However, communicating a feedback message about the identification is possible.

Anyway, it can be desirable to implement only feedback, but no blocking, as the user may be warned if some content is noticeably blocked. If he is warned, he might not continue the offensive activities, so prosecution is complicated. This is valid for any embodiment, regardless of the kind of implementation.

Like in the pure hardware implementation of FIG. 1, the pure software implementation of FIG. 2 can also utilize a nearby cellular phone 14 or another wireless phone as described above for identifying the user, determining the whereabout of the computer system 1, and/or communicating a feedback message to a surveillance instance.

Figure 4:
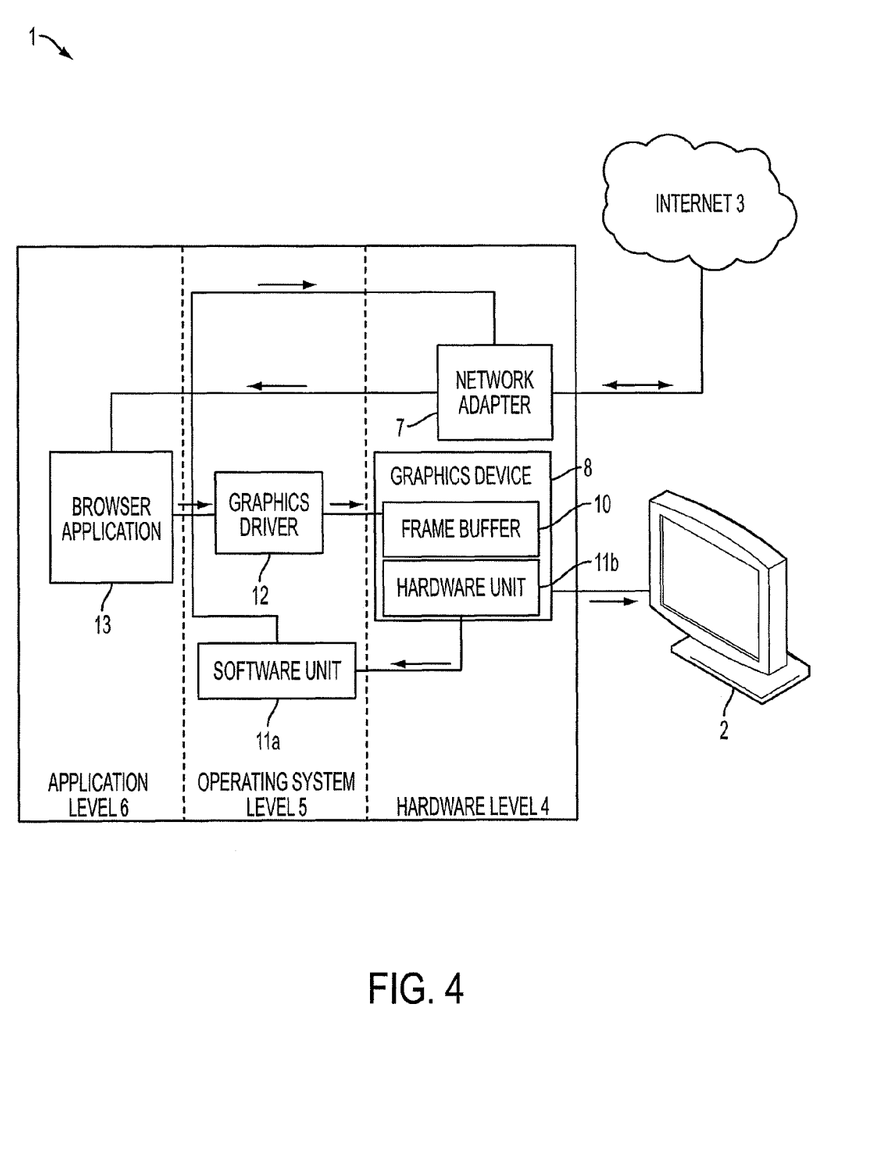
FIG. 4 shows an embodiment using a combination of hardware and software monitoring unit.

Another embodiment is shown by FIG. 4. Here, the monitoring unit 11 is a combination of a hardware unit 11b and software unit 11a. The retrieval of image data is performed within the Hardware Level 4. It is then transferred to the Operating System Level 5 where the examination and, potentially, identification takes place.

Figure 5:
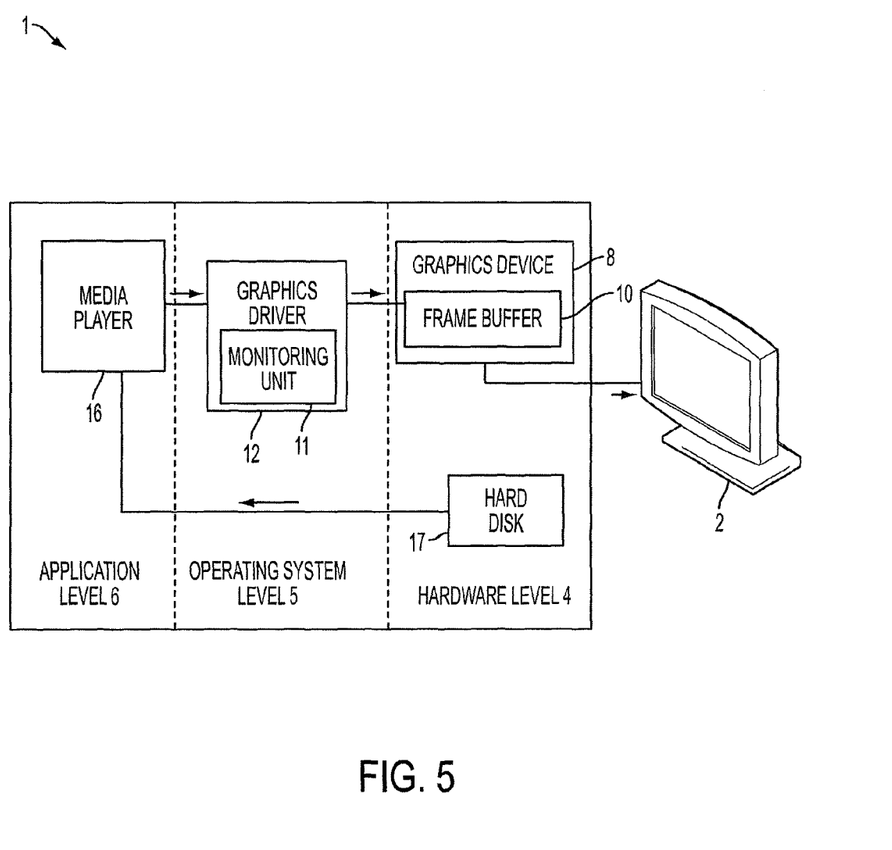
FIG. 5 shows a blocking-only embodiment without internet access.

FIG. 5 shows an embodiment without any connection to the internet 3. It is designed only to block offensive attributes. For this purpose, a graphics driver is provided which comprises the monitoring unit 11 in software. For example, a media player 16 is playing a combined audio/video stream from a file located on a hard disk 17. Any information that is rendered to the frame buffer 10 is examined for offensive attributes, e. g. a large fraction of naked skin. If offensive attributes are identified, they or the whole screen may be blackened or garbled otherwise.

The invention is not limited to monitoring activities of children. It is also useful for monitoring criminal or terrorist activities. The criteria for identification and classification just have to be adapted. For example, the image recognition could be prepared for weapons, certain chemistry formulas, bombs, diagrams of nuclear plants or predefined symbols. The optical character recognition can be prepared for appropriate keywords describing religious fanaticism, names of extremist persons or organizations such as "Osama bin Laden" and "al-Qaeda", calls for assaults or instructions for building traps or bombs, for example. It is even possible to integrate a special variation into the data of digital documents that are secret or that are intentionally distributed. The data variation is predefined as an "offensive attribute" and will thus be recognized. The documents carrying the variation can thus be traced all over the world. If such a document is viewed or printed somewhere, the monitoring according to the present invention will signal the event to a predefined authority. So, the respective user can be located and arrested or observed further.

For this purpose, the software version, as described above, is preferred. As no system administrator privileges are required for installation, appropriate software may be distributed without the knowledge of the public. For example, it may be bundled or integrated with popular free software such as document readers. Many people use this kind of software. As frequently new versions are released, it is possible to distribute updates of the bundled/integrated monitoring software, too.

It is even possible to prepare popular websites in such a way that the monitoring software is injected into computers browsing to these websites, utilizing security breaches commonly available in browsers and operating systems. For example, a downloading routine may be implemented within a picture to produce a stack overflow within the browser. If the website, showing the prepared picture, is viewed, the computer system 1 used for viewing will download and install the monitoring software. This procedure can be used especially for pictures that are of interest to a certain audience, for example pictures or maps of a potential assault target such as public or military buildings, in particular if such intentions have been reported by intelligence. Besides, an on-line rogues' gallery can be prepared appropriately. If a criminal or terrorist is querying the gallery to check what is known about him, he can be tracked using the invention.

The invention is not limited to computer systems 1. It may also be applied to cellular phones, personal digital assistants, set top boxes, television sets and any other electronic devices. In any case, the invention is not limited to using a frame buffer in dedicated graphics memory. Rather, a frame buffer may also be a temporary storage area of the operating system or a shared memory area in the main memory.

What is claimed is:

1. A method for monitoring a user's activities on an electronic device comprising a hardware level, an operating system level and an application level, the activities comprising an output of content loaded from a content source by an application in the application level, which finally outputs the content to a human readable device via a graphics device having a monitoring unit and a frame buffer and a graphics processor arranged within the hardware level, wherein the frame buffer holds digital image data representing the content to be output and is the last instance in which the content to be output is digitally available, wherein the digital image data in the frame buffer is periodically read by the graphics processor and output to the human readable device, the method comprising the steps of:
    retrieving the image data from the frame buffer;
    examining the image data by performing a content-based classification of the image data;
    identifying an offensive attribute within the image data, wherein the identifying is performed based on the examining of the image data and independently from the content source of the image data; and
    reacting to the attribute in a predefined way by modifying parts of or the whole of the frame buffer,
    wherein the steps are performed by the monitoring unit.

2. The method as recited in claim 1, wherein the reacting step comprises denying the output of at least a part of the image data.

3. The method as recited in claim 1, wherein the reacting step comprises replacing at least a part of the image data by a predefined substitute.

4. The method as recited in claim 1, wherein the reacting step comprises logging an identification of the offensive attribute into a memory.

5. The method as recited in claim 1, wherein the reacting step comprises communicating a message to a surveillance instance, the message comprising at least one of an indicator for an identification of the offensive attribute and a plurality of indicators for identifications logged earlier.

6. The method as recited in claim 5, wherein the reacting step comprises waiting for an established internet connection before communicating the message.

7. The method as recited in claim 5, further comprising the step of determining a whereabout of the device by means of a positioning system and wherein the message comprises the whereabout.

8. The method as recited in claim 7, further comprising detecting a nearby cellular phone and wherein the whereabout is determined utilizing the nearby cellular phone.

9. The method as recited in claim 5, further comprising detecting a nearby cellular phone and wherein the message is communicated via the nearby cellular phone.

10. The method as recited in claim 1, wherein the content-based classification comprises an optical character recognition.

11. The method as recited in claim 1, wherein the graphics device includes one of a graphics adapter and a graphics processing unit of a printer.

12. The method as recited in claim 1, wherein the frame buffer is integrated into the graphics device.

13. The method as recited in claim 1, further comprising matching the offensive attribute with predefined categories for determining the predefined way.

14. The method as recited in claim 13, further comprising tracing a document containing the variation.

15. The method as recited in claim 1, wherein the offensive attribute is a variation in the image data, predefined to be recognizable by the method.

16. An apparatus for monitoring a user's activities on an electronic device comprising a hardware level, an operating system level and an application level, the activities comprising an output of content loaded from a content source by an application in the application level, which finally outputs the content to a human readable device via a graphics device having a monitoring unit and a frame buffer and a graphics processor arranged within the hardware level, wherein the frame buffer holds digital image data representing the content to be output and is the last instance where the content to be output is digitally available, wherein the digital image data in the frame buffer is periodically read by the graphics processor and output to the human readable device, and comprising:
- a retrieving unit configured to retrieve the image data from the frame buffer;
- an examination and identification unit configured to examine the image data by performing a content-based classification of the image data so as to identify an offensive attribute within the image data, wherein the identifying is based on the examining of the image data and independently from the content source of the image data; and
- a reaction unit configured to react to the attribute in a predefined way by modifying part of or the whole of the frame buffer.

17. The apparatus as recited in claim 16, wherein the apparatus includes at least one of a graphics controller for a graphics adapter for a computer, a cellular phone, a handheld computer, a digital television set, and a graphics processing unit for a printer.

* * * * *